June 9, 1959  J. M. ENDRES  2,889,640
DISC SNOW PLOW

Filed June 18, 1956 2 Sheets-Sheet 1

John M. Endres
INVENTOR.

BY *Clarence A. O'Brien
and Harvey B. Jackson*
Attorneys

June 9, 1959  J. M. ENDRES  2,889,640
DISC SNOW PLOW
Filed June 18, 1956  2 Sheets-Sheet 2
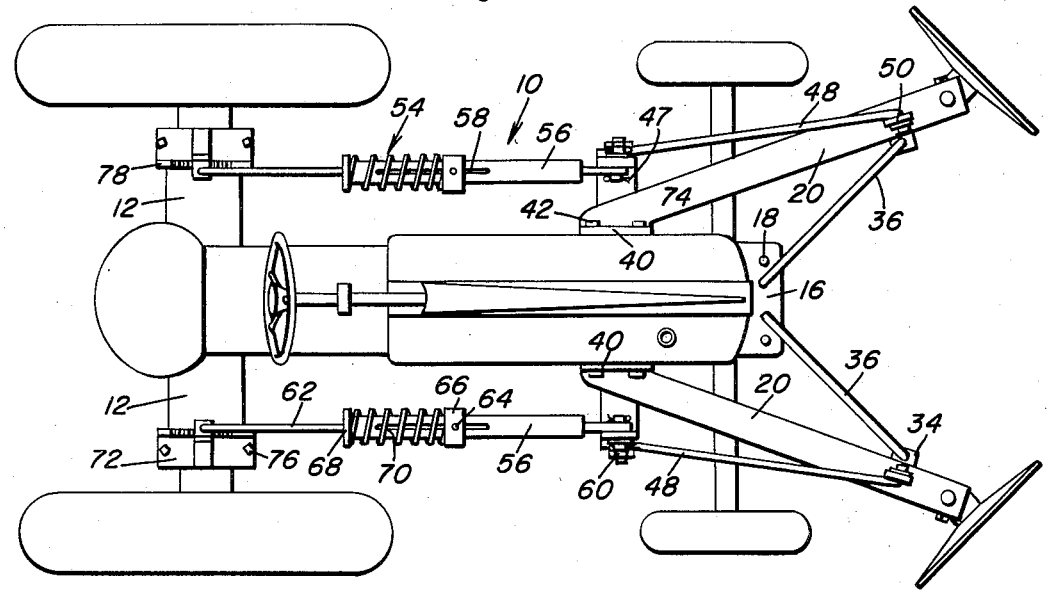
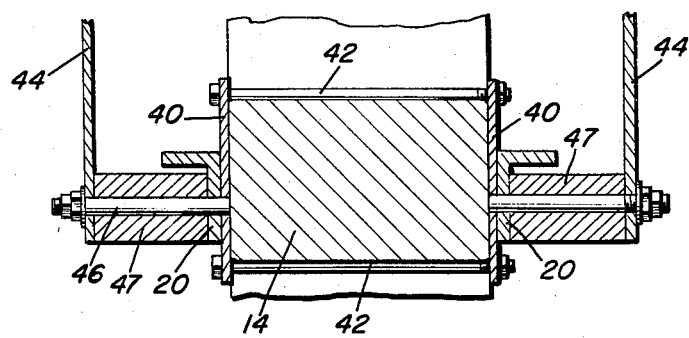
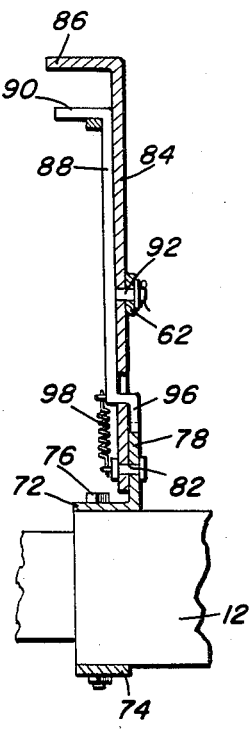
John M. Endres
INVENTOR.

United States Patent Office 2,889,640
Patented June 9, 1959

2,889,640

DISC SNOW PLOW

John M. Endres, Mitchell, S. Dak., assignor of fifty percent to Donald J. Endres, Grand Forks, N. Dak.

Application June 18, 1956, Serial No. 592,064

1 Claim. (Cl. 37—42)

This invention comprises a novel and useful disc snow plow and more particularly relates to a snow plow attachment for tractors.

The primary object of this invention is to provide a snow plow attachment for tractors and which shall employ the advantages of a rolling disc cultivator as a plow blade to a mounting upon a tractor as an implement for removing snow.

A further object of the invention is to provide an attachment which may be readily applied to conventional tractors, together with means whereby the snow plow attachment may be readily raised or lowered into and from its operative position.

Yet another object of the invention is to provide a snow plow attachment for tractors wherein a pair of disc plows may be mounted in an improved manner upon the front of a tractor and may be independently raised or lowered with respect thereto.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a top plan view of the tractor in accordance with Figure 1;

Figure 4 is a detailed view taken upon an enlarged scale substantially upon the plane indicated by the section line 4—4 of Figure 1;

Figure 5 is a detailed view taken upon an enlarged scale taken substantially upon the plane indicated by section line 5—5 of Figure 1.

Figure 1:
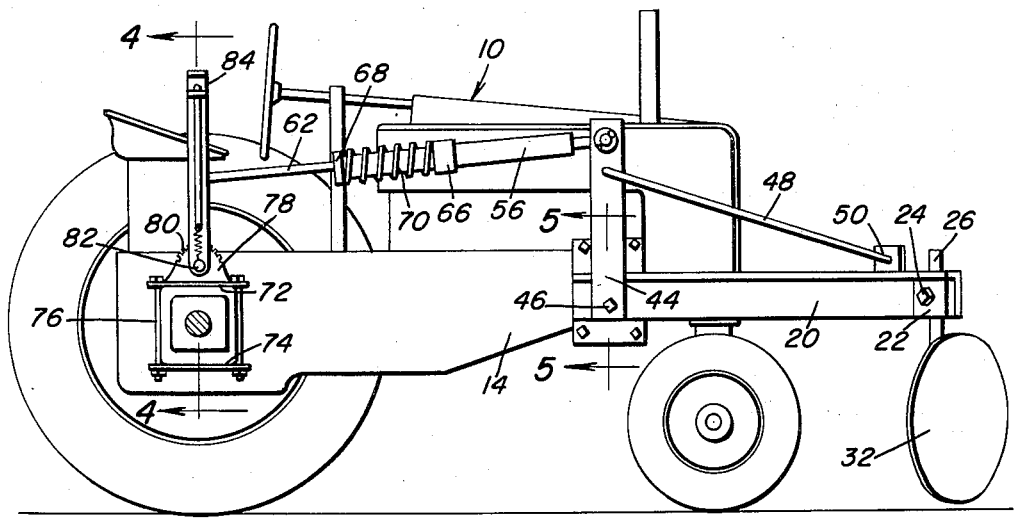
Figure 1 is a side elevational view, a part of the rear axle being broken away and shown in vertical section, and showing a conventional form of tractor having the snow plow attachment in accordance with this invention applied thereto, and showing the snow plow attachment in its operative position.
Figure 2:
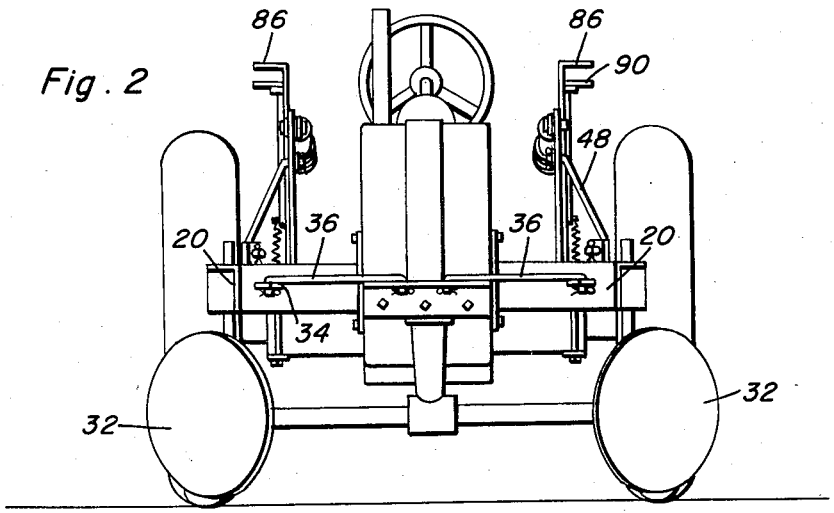
Figure 2 is a front elevational view of the arrangement of Figure 1.

Reference is now made more specifically to the accompanying drawings which illustrate one satifactory manner for applying thereto the principles of the invention and wherein the numeral 10 designates generally any conventional form of tractor, the same including the rear axle housings 12 and a front frame member 14, the tractor at its front end having a forwardly extending plate 16 having suitable apertures 18 therein whereby various implements may be attached to the tractor.

The snow plow attachment of this invention consists of a pair of substantially horizontal forwardly divergent beams 20, adapted to be secured as clearly set forth hereinafter at their rear ends to a forward portion of the frame 14 of the tractor.

Figure 6:
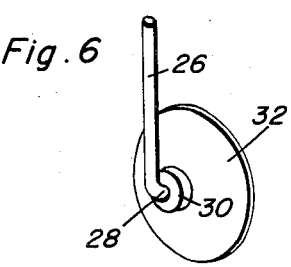
Figure 6 is a perspective view of a disc plow forming a snow plow in accordance with this invention.

At their forward ends, each of the beams 20 is provided with a conventional clamping bracket 22 and a fastening bolt 24 therefor by means of which a vertical tool shaft 26, see also Figure 6, may be clamped in vertically adjusted position. At its lower end, the tool shaft 26 is provided with a horizontally extending arm 28 upon which is journaled the hub portion 30 of a conventional type of disc plow blade 32. By means of the clamping arrangement, it is obvious that the pair of disc plow blades 32 may be positioned at any desired angle with respect to each other, for the purpose of constituting a snow plow attachment for pushing snow to one side during forward movement of the tractor.

Each of the horizontal beams 20, adjacent its forward portion, is provided with an apertured laterally extending lug 34 and brace rods 36 connect the lugs of each beam with one of the apertures in the implement bracket 16, as will be apparent from Figure 3.

Referring now primarily to Figures 1–3 and 5, it will be seen that there is provided a mounting means whereby the rearward ends of the beams 20 may be secured to the frame of the tractor.

For this purpose, the rearward end of each of the beams is provided with perpendicular mounting brackets 40 which are adapted to be clamped as by bolts 42 to the frame 14. Rising from each of the brackets 40 is an arm 44, secured thereto as by an axle or bolt 46 and spacer 47, and which arms adjacent their upper extremities are provided with a pair of apertures for a purpose to be subsequently set forth.

A pair of brace rods 48 has the lower extremity of each secured to an apertured lug 50 rising from the top surface of the forward portion of each of the beams 20, while the rear end of the same is secured in one of the apertures in the arm 44. It will thus be seen that by means of the brace rods there is provided a triangular braced lever or crank arm 44 which is thus pivotally secured to the beam 20.

Actuating means are provided for causing upward and downward tilting of the beam about the axle 46 in order to adjust the vertical position of the plow blades 32. This actuating means comprises a pair of connectors each designated generally by the numeral 54. Each connector comprises a cylinder 56 having a longitudinal slot 58 adjacent its rearward end, the cylinder being pivotally connected as by pivot bolts 60 to the uppermost apertured end of the arm 44 of each of the beams. A rod 62 has its forward end slidable in the cylinder 56 and secured as by means of a pin 64 extending through the slot 58, into a collar or sleeve 66 slidable upon the cylinder. At the rear end of the cylinder there is provided a flange or collar 68 and a compression spring 70 encircles the cylinder between the collars 66 and 68. It will thus be apparent that the rod 62 together with the cylinder 56 constitutes a connecting link which is of a resilient or cushioning character.

Referring now especially to Figures 1 and 4, it will be seen that a pair of plates 72 and 74 are mounted upon and clamped to each of the axle housings 12 as by means of fastening bolts 76. From the upper plate 72 rises a bracket 78 whose upper edge is a quadrant having sector teeth 80.

Pivoted to the sector plate as by a pivot pin 82 is an adjusting lever 84 having a handle 86. A latch bar 88 is provided having a handle 90 disposed parallel to the handle 86, the latch bar being slidably mounted as by a bolt 92 to the standard 84 and at its lower end is provided with an offset depending toothed portion 96 constituting a detent adapted to cooperate with the ratchet teeth 80 of the sector plate. A tension spring 98 cooperates with the latch bar 88 and the pivot pin 82 for yieldingly urging the latching bar into engagement with the sector teeth.

At its rearward end, the previously mentioned rod 62 is secured by the above mentioned pivoted fastener 92 to the lever 84. As will be apparent, one of the adjusting levers is provided for each of the beams and plow blades.

By the foregoing arrangement, it is evident that the beams may be raised or lowered to position the plows at a desired elevation, thereby enabling the plows to be individually adjusted.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A snowplow attachment for tractors comprising a pair of forwardly divergent substantially horizontal support beams, horizontal means pivotally securing the rear ends of said beams to the side frame of a tractor adjacent the forward end thereof, a vertical post pivotally mounted upon the forward end each beam for horizontal turning movement, said vertical post having a horizontal axle projecting laterally from the lower end thereof, a disk comprising a snowplow journaled on said axle for rotation, resilient means for effecting vertical tilting of each beam about said horizontal pivot for independently raising and lowering said disks, said last mentioned means comprising a lever arm rigidly secured to each beam, a lever, means for pivotally mounting each lever to the rear axle housing of a tractor, a resilient connection between each lever and one of said beams, each connector including a cylinder pivoted at one end to a lever arm and having a longitudinal slot therein, a rod slidable in said cylinder and pivoted to said lever, a spring surrounding said cylinder, means attached to said spring and extending through said slot and secured to said rod, means attaching the said spring to the rod.

References Cited in the file of this patent

UNITED STATES PATENTS

| | | |
|---|---|---|
| 1,262,866 | Mahon | Apr. 16, 1918 |
| 1,361,638 | Stephenson | Dec. 7, 1920 |
| 1,774,008 | Hester | Aug. 26, 1930 |
| 2,041,832 | Hester | May 26, 1936 |
| 2,505,280 | Ellinghuysen | Apr. 25, 1950 |
| 2,582,136 | Koblas | Jan. 8, 1952 |
| 2,609,741 | Evenson | Sept. 9, 1952 |